(12) United States Patent
Lee et al.

(10) Patent No.: US 10,501,086 B2
(45) Date of Patent: Dec. 10, 2019

(54) METHOD FOR CONTROLLING HYBRID VEHICLE

(71) Applicants: Hyundai Motor Company, Seoul (KR); Kia Motors Corporation, Seoul (KR)

(72) Inventors: Young Jun Lee, Seoul (KR); Jung Wan Choi, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 151 days.

(21) Appl. No.: 15/818,620

(22) Filed: Nov. 20, 2017

(65) Prior Publication Data

US 2019/0054921 A1     Feb. 21, 2019

(30) Foreign Application Priority Data

Aug. 18, 2017   (KR) ........................ 10-2017-0104769

(51) Int. Cl.
*B60W 10/02* (2006.01)
*B60W 30/184* (2012.01)
(Continued)

(52) U.S. Cl.
CPC ........ *B60W 30/1846* (2013.01); *B60W 10/02* (2013.01); *B60W 10/08* (2013.01);
(Continued)

(58) Field of Classification Search
CPC .. B60W 30/1846; B60W 10/02; B60W 10/08; B60W 10/11; B60W 20/00
(Continued)

(56) References Cited

U.S. PATENT DOCUMENTS

2014/0277890 A1*  9/2014  Ideshio ................... B60K 6/48
                                                          701/22
2016/0214600 A1*  7/2016  Miyaishi ................ B60K 6/48
                         (Continued)

FOREIGN PATENT DOCUMENTS

JP     2016-188052 A    11/2016
KR   10-1558812 B1     10/2015
                        (Continued)

*Primary Examiner* — Thomas G Black
*Assistant Examiner* — Wae L Louie
(74) *Attorney, Agent, or Firm* — Morgan, Lewis & Bockius LLP

(57) ABSTRACT

A method for controlling a hybrid vehicle may include detecting, in a controller, a circumstance that a vehicle is rapidly decelerated and then rapidly accelerated; confirming that a transmission clutch slipped in the controller as a result of performing the detecting; reducing a driving torque and a motor speed while minimizing a hydraulic pressure of the transmission clutch in the controller, in the case that the transmission clutch has slipped as a result of performing the confirming; determining when the transmission clutch is available for synchronization in the controller while performing the reducing; and normalizing the hydraulic pressure of the transmission clutch and the driving torque in the controller, in the case that it is determined that the transmission clutch is available for synchronization as a result of performing the determining.

6 Claims, 3 Drawing Sheets

(51) Int. Cl.
  *B60W 10/11* (2012.01)
  *B60W 20/00* (2016.01)
  *B60W 10/08* (2006.01)
(52) U.S. Cl.
  CPC ............ *B60W 10/11* (2013.01); *B60W 20/00* (2013.01); *B60W 2510/0241* (2013.01); *B60W 2510/081* (2013.01); *B60W 2510/083* (2013.01); *B60W 2510/1015* (2013.01); *B60W 2520/10* (2013.01); *B60W 2520/105* (2013.01); *B60W 2540/10* (2013.01); *B60W 2710/081* (2013.01); *B60W 2710/083* (2013.01); *B60W 2710/1083* (2013.01); *B60Y 2200/92* (2013.01); *Y10S 903/93* (2013.01)
(58) Field of Classification Search
  USPC .......................................................... 701/22
  See application file for complete search history.

(56) References Cited

U.S. PATENT DOCUMENTS

| | | | | |
|---|---|---|---|---|
| 2016/0244051 | A1* | 8/2016 | Ikeda | B60K 6/48 |
| 2016/0272192 | A1* | 9/2016 | Ashizawa | B60W 20/40 |
| 2016/0297419 | A1* | 10/2016 | Zhang | F16H 61/48 |
| 2016/0304075 | A1* | 10/2016 | Gibson | B60W 20/00 |
| 2017/0008510 | A1* | 1/2017 | Imamura | B60L 58/12 |
| 2017/0106872 | A1* | 4/2017 | Imamura | B60W 10/08 |
| 2017/0166196 | A1* | 6/2017 | Park | B60W 10/02 |
| 2017/0274754 | A1* | 9/2017 | Imamura | B60K 6/365 |
| 2018/0312050 | A1* | 11/2018 | Endo | B60K 6/387 |
| 2019/0054921 | A1* | 2/2019 | Lee | B60W 30/1846 |

FOREIGN PATENT DOCUMENTS

| | | |
|---|---|---|
| KR | 10-1725546 B1 | 4/2017 |
| KR | 10-1734262 B1 | 5/2017 |

* cited by examiner

METHOD FOR CONTROLLING HYBRID VEHICLE

CROSS-REFERENCE(S) TO RELATED APPLICATIONS

The present application claims priority to Korean Patent Application No. 10-2017-0104769, filed on Aug. 18, 2017, the entire contents of which is incorporated herein for all purposes by this reference.

BACKGROUND OF THE INVENTION

Field of the Invention

The present invention relates to a control method for preventing occurrence of an impact on a transmission under the circumstance that a hybrid vehicle is rapidly decelerated and then rapidly accelerated.

Description of Related Art

Generally, a hybrid vehicle is disposed with a transmission that receives electric power generated in an engine or a motor and controls a driving speed of the vehicle. The transmission may be classified as a manual transmission controlled by a driver, an automatic transmission automatically controlled according to the driving speed of the vehicle, and an automated manual transmission having the advantages of both the manual transmission and the automatic transmission.

The transmission requires a transmission oil for formation of a hydraulic pressure, a lubrication operation, and a cooling operation; and an Electric Oil Pump (EOP) is configured to supply an optimal amount of the transmission oil to the transmission.

Herein, the EOP determines a hydraulic pressure for controlling a transmission clutch based on a torque of the engine or the motor, enhancing a response performance of the transmission.

However, a level of the transmission oil optimized for enhancing fuel efficiency may instantaneously become lack, or imbalanced, due to an inertia operation of the transmission, in the case that the vehicle is rapidly decelerated and then rapidly accelerated.

In the present case, slip occurs on the transmission clutch due to the lack of oil; and in the case that the hydraulic pressure is formed in late response thereto, a motor speed and an input shaft speed of the transmission are rapidly synchronized, incurring a large impact thereon. Since the foregoing greatly reduces marketability of a vehicle, research and development for resolving the above issues continues.

The information disclosed in this Background of the Invention section is only for enhancement of understanding of the general background of the invention and should not be taken as an acknowledgement or any form of suggestion that this information forms the prior art already known a person skilled in the art.

BRIEF SUMMARY

Various aspects of the present invention are directed to providing a control method for rapidly resolving a circumstance when a transmission clutch has slipped without impact thereon, in the case that the transmission clutch slipped under the circumstance that a hybrid vehicle is rapidly decelerated and then rapidly accelerated.

A method for controlling a hybrid vehicle according to an exemplary embodiment of the present invention may include detecting, in a controller, a circumstance that a vehicle is rapidly decelerated and then rapidly accelerated; confirming that a transmission clutch has slipped in the controller, in the case of detecting the circumstance that the vehicle is rapidly decelerated and then rapidly accelerated as a result of performing the detecting; reducing a driving torque and a motor speed while minimizing a hydraulic pressure of the transmission clutch in the controller, in the case that the transmission clutch has slipped as a result of performing the confirming; determining when the transmission clutch is available for synchronization in the controller while performing the reducing; and normalizing the hydraulic pressure of the transmission clutch and the driving torque in the controller, in the case that it is determined that the transmission clutch is available for synchronization as a result of performing the determining.

At the detecting, the controller may be configured for detecting the circumstance that the vehicle is rapidly decelerated and then rapidly accelerated in the case that a depression amount of an accelerator pedal is more than Middle Tip-in (MTI) within a certain time period from the timing that an acceleration of the vehicle is more than a reference acceleration and a vehicle speed is less than a reference vehicle speed.

At the confirming, the controller may be configured for confirming that the transmission clutch slipped in the case that the motor speed is more than the sum of an input shaft speed of the transmission and a predetermined speed.

At the reducing step, the controller may be configured for determining and controlling a minimum of the hydraulic pressure of the transmission clutch based on the driving torque.

At the determining, the controller may be configured for determining as a status that the transmission clutch is available for synchronization, in the case that a difference between the motor speed and the input shaft speed of the transmission is less than a reference value.

At the normalizing, the controller may be configured for controlling normalization of the hydraulic pressure of the transmission clutch and the driving torque based on the depression amount of the accelerator pedal.

According to the method of controlling the hybrid vehicle including the above-described structure, it is possible to rapidly resynchronize the transmission clutch in the case that the transmission clutch has slipped under the circumstance that the vehicle is rapidly decelerated and then rapidly accelerated, enhancing driving performance of the vehicle.

Furthermore, it is possible to prevent impact thereon occurring at the resynchronizing of the transmission clutch, securing durability of the transmission.

Furthermore, since a control of reducing the motor speed and the driving torque is implemented before resynchronizing the transmission clutch, it is possible to prevent occurrence of noise due to an excessive increment of the motor speed and to obtain a resynchronized speed of the transmission clutch as rapidly as possible, enhancing marketability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
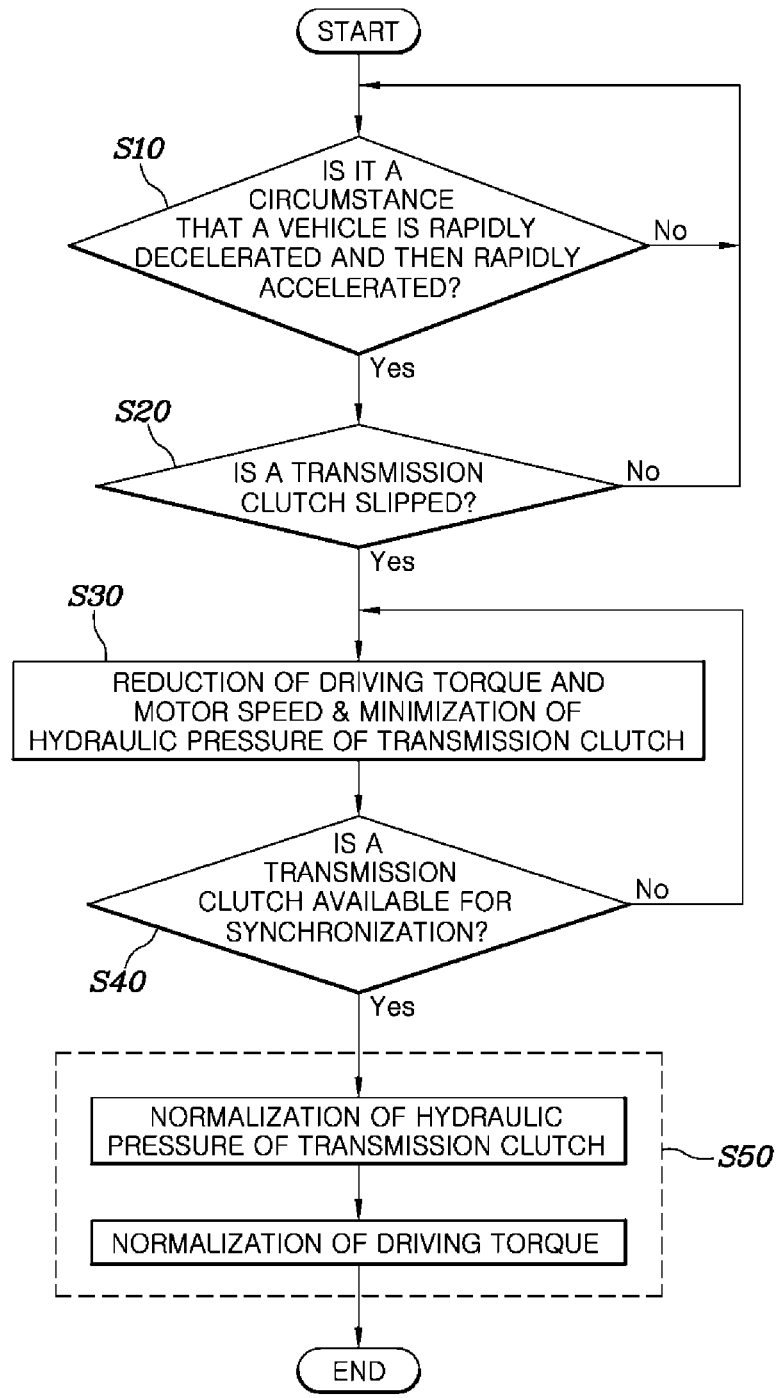
FIG. 1 is a flowchart illustrating a method for controlling a hybrid vehicle according to an exemplary embodiment of the present invention.
Figure 2:
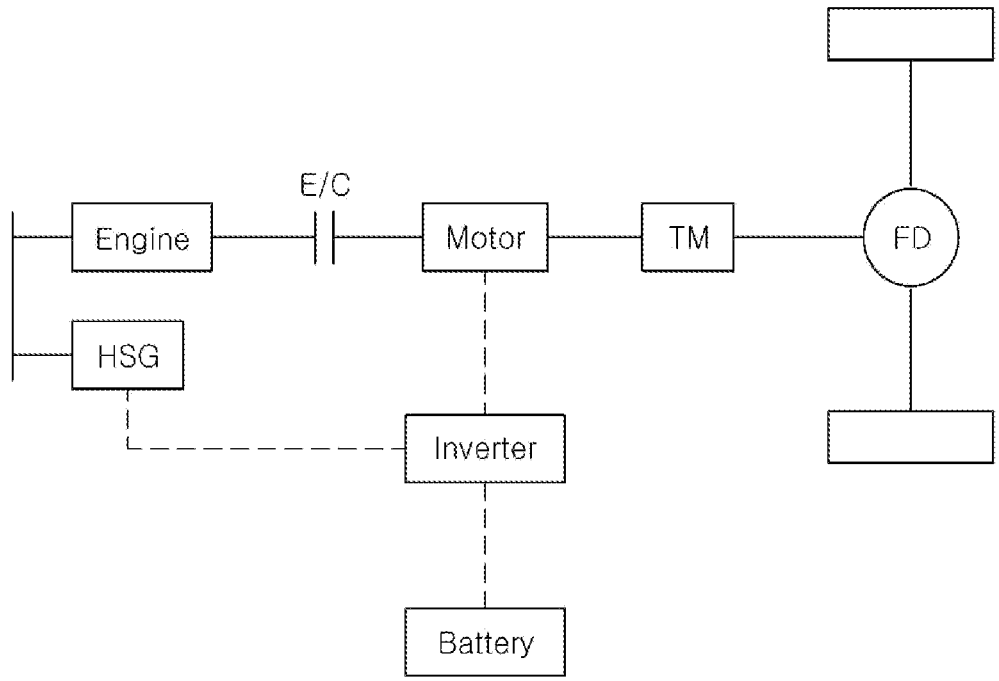
FIG. 2 is a view schematically illustrating the hybrid vehicle according to an exemplary embodiment of the present invention.

FIG. 1 is a flowchart illustrating a method for controlling a hybrid vehicle according to an exemplary embodiment of the present invention; FIG. 2 is a view schematically illustrating the hybrid vehicle according to an exemplary embodiment of the present invention; and FIG. 3 is a view schematically illustrating a control apparatus of the hybrid vehicle according to an exemplary embodiment of the present invention.

Figure 3:
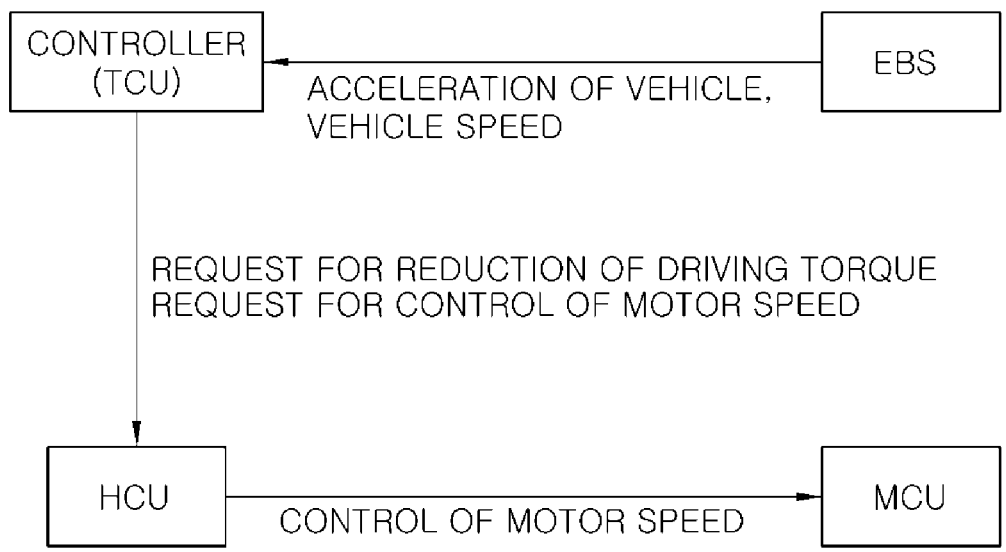
FIG. 3 is a view schematically illustrating a control apparatus of the hybrid vehicle according to an exemplary embodiment of the present invention.

Referring to FIG. 1, FIG. 2, and FIG. 3, a method for controlling a hybrid vehicle of the present invention may include detecting a circumstance that a vehicle is rapidly decelerated and then rapidly accelerated in a controller (S10); confirming that a transmission clutch has slipped in the controller (S20), in the case of detecting the circumstance that the vehicle is rapidly decelerated and then rapidly accelerated as a result of performing the detecting (S10); reducing a driving torque and a motor speed while minimizing a hydraulic pressure of the transmission clutch in the controller (S30), in the case that the transmission clutch slipped as a result of performing the confirming (S20); determining the transmission clutch is available for synchronization in the controller (S40) while performing the reducing (S30); and normalizing the hydraulic pressure of the transmission clutch and the driving torque in the controller (S50), in the case that it is determined that the transmission clutch is available for synchronization as a result of performing the determining (S40).

That is, in the case that a driver rapidly decelerates a vehicle, a phenomenon of oil deflection instantaneously occurs on the transmission. Accordingly, a phenomenon of a lack of the hydraulic pressure occurs on the transmission (TM) and sufficient oil is not supplied to the transmission clutch, occurring slip thereon.

In the present case, since the transmission clutch has slipped in the case that the driver rapidly accelerates the vehicle, a load is not applied to a motor, rapidly increasing the motor speed; and then in the case that the hydraulic pressure of the transmission clutch is normalized, the motor speed is synchronized to a relatively low input shaft speed of the transmission, occurring a large impact thereon.

Accordingly, the controller, according to an exemplary embodiment of the present invention, is configured to reduce the driving torque and the motor speed of the vehicle at the status that detects the circumstance that a driver rapidly decelerates and then rapidly accelerates the vehicle and that minimizes the hydraulic pressure of the transmission clutch and normalizes the hydraulic pressure of the transmission clutch only in the case that a condition that the transmission clutch may be synchronized without impact thereon is satisfied, preventing impact thereon upon resynchronization of the transmission clutch.

Herein, the controller is a Transmission Control Unit (TCU) controlling the transmission. Referring to FIG. 2, the present invention may be applied to a Transmission Mounted Electric Device (TMED)-type hybrid vehicle.

Herein, the TCU, which is the controller, may detect the circumstance that the vehicle is rapidly decelerated and then rapidly accelerated based on data receiving in communication with an Electrical Brake System (EBS).

At the detecting (S10), the controller is configured to detect as the circumstance that the vehicle is rapidly decelerated and then rapidly accelerated, in the case that a depression amount of an accelerator pedal is more than Middle Tip-in (MTI) within a certain time period from the timing that an acceleration of the vehicle is more than a reference acceleration and a vehicle speed is less than a reference vehicle speed.

The EBS is configured to detect data including a vehicle speed, an acceleration, a brake stroke, a brake hydraulic pressure of the vehicle and the like; and the controller may receive the information related to the vehicle speed and the acceleration of the vehicle from the EBS and detect the status that the vehicle speed is less than the reference vehicle speed and the acceleration is more than the predetermined reference acceleration.

That is, since the vehicle speed becomes low but the acceleration of the vehicle is highly determined in the case that the vehicle is rapidly decelerated, the controller may detect a rapid deceleration of the vehicle based on the vehicle speed and the acceleration.

Furthermore, since the depression amount of the accelerator pedal rapidly increases in the case that the vehicle is rapidly accelerated, the controller (TCU) may detect a rapid acceleration of the vehicle based on the depression amount of the accelerator pedal. Herein, the Middle Tip-in (MTI) means that the depression amount of the accelerator pedal is a half of a total depression.

Herein, the controller (TCU) may be configured to detect a rapid deceleration of the vehicle and a rapid acceleration of the vehicle within a certain time period based on data received from the EBS, detecting the circumstance that the vehicle is rapidly decelerated and then rapidly accelerated.

Meanwhile, the controller (TCU) performs the confirming (S20) that the hybrid vehicle is rapidly decelerated and then rapidly accelerated, occurring oil deflection and slip of the transmission clutch. At the confirming (S20), the controller (TCU) may be configured to confirm that the transmission clutch slipped in the case that the motor speed is more than the sum of the input shaft speed of the transmission and the predetermined speed.

That is, in the case that the transmission clutch slipped, a load is not applied to a motor and the motor speed rapidly increases. Accordingly, assuming that the predetermined speed was 100 RPM, it may be determined that the transmission clutch slipped in the case that the motor speed becomes more than the value adding 100 RPM to the input shaft speed of the transmission.

Accordingly, in a case of confirming that the transmission clutch has slipped, a control of the motor speed and the input torque is implemented for alleviating impact thereon upon resynchronization thereof.

The controller reduces the driving torque and the motor speed while minimizing the hydraulic pressure of the transmission clutch; and at the reducing (S30), the controller may be configured to determine and control a minimum of the hydraulic pressure of the transmission clutch based on the driving torque.

In the present case, the controller (TCU) may be configured to transmit a control signal to a Hybrid Control Unit (HCU) to reduce the driving torque and the motor speed; and to directly control the hydraulic pressure of the transmission clutch. Herein, the HCU may transmit a command reducing the motor speed to a Motor Control Unit (MCU) controlling a motor and control the motor speed.

Figure 4:
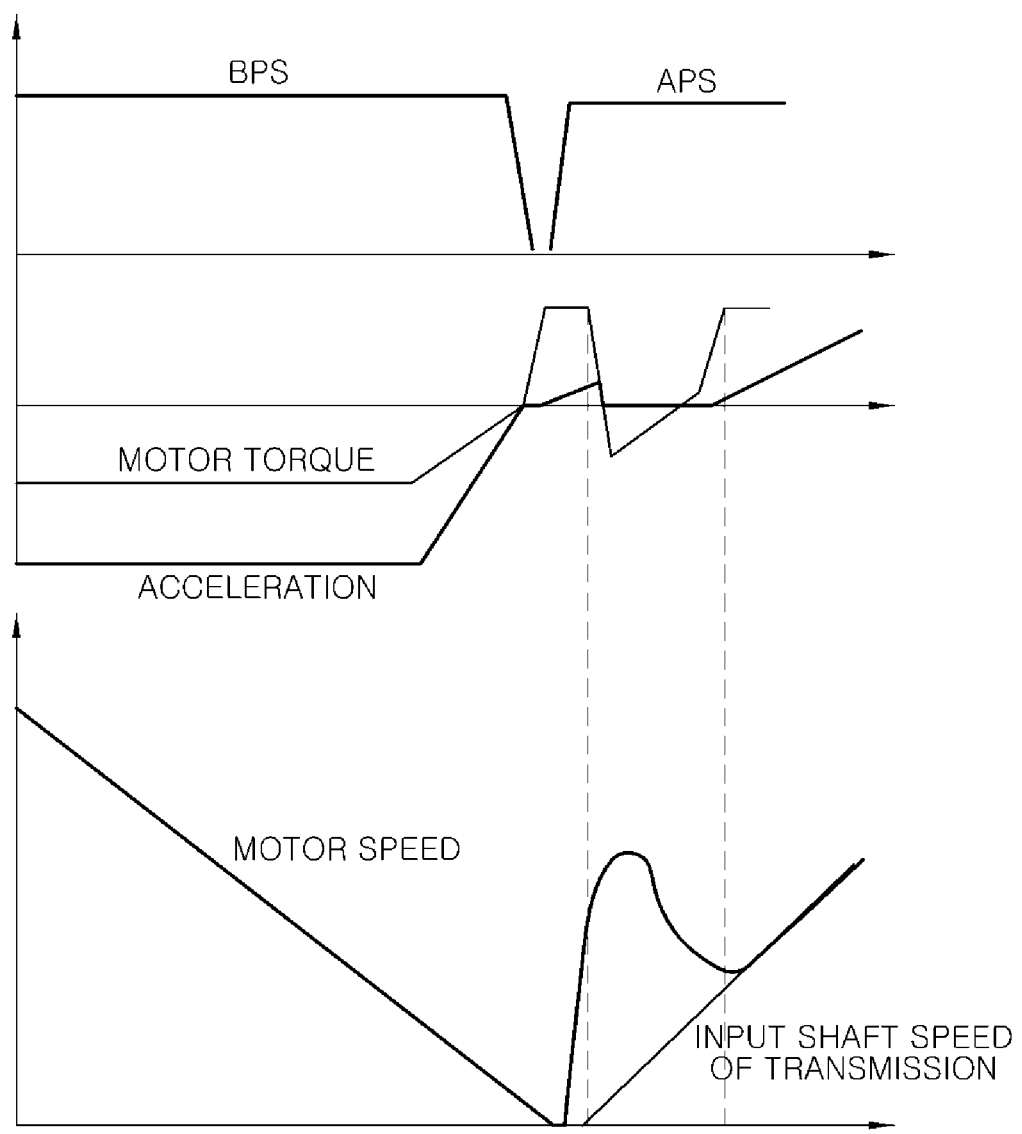
FIG. 4 is a graph illustrating a vehicle status by the method for controlling the hybrid vehicle according to an exemplary embodiment of the present invention.

FIG. 4 is a graph illustrating a vehicle status by the method for controlling the hybrid vehicle according to an exemplary embodiment of the present invention. Referring to FIG. 4, in the case that the hybrid vehicle is rapidly decelerated and then rapidly accelerated by a driver including detecting values of a Brake Pedal Sensor (BPS) and an Accelerator Pedal Sensor (APS) and flow of the vehicle acceleration, the controller confirms that the transmission clutch slipped, and the controller controls the hydraulic pressure of the transmission clutch, initially at a minimum degree that may deliver a reduced driving torque.

As such, the motor torque (i.e., the driving torque) and the motor speed may be reduced, preventing the occurrence of noise due to an excessive increment of the motor speed, or preventing occurrence of impact thereon due to a large difference between the motor speed and the input shaft speed of the transmission upon recoupling of the transmission clutch. Furthermore, it is possible to make the motor speed rapidly converge on the input shaft speed of the transmission clutch, resolving a slip phenomenon of the transmission clutch as rapidly as possible.

Furthermore, the controller (TCU) of the present invention continues to determine when the transmission clutch is available for synchronization while performing the reducing (S30); and at the determining (S40), it is determined that the transmission clutch is available for synchronization in the case that a difference between the motor speed and the input shaft speed of the transmission is less than a reference value.

For example, assuming that the reference value was 10 revolutions per minutes (RPM), in the case that a difference between the motor speed and the input shaft speed of the transmission becomes less than 10 RPM, the impact thereon does not occur even though the hydraulic pressure of the transmission clutch is normalized.

Accordingly, in a case of detecting release of the transmission clutch under the circumstance that the hybrid vehicle is rapidly decelerated and then rapidly accelerated, it is possible to again recouple the transmission clutch without impact thereon.

Accordingly, the controller may normalize the hydraulic pressure of the transmission clutch and the driving torque in the case that it is determined that the transmission clutch is available for synchronization, completely resolving the slip phenomenon of the transmission clutch occurred by oil deflection.

Herein, at the normalizing (S50), the controller (TCU) may determine the hydraulic pressure of the transmission clutch and the driving torque based on the depression amount of the accelerator pedal, performing a control of normalization.

According to the method for controlling the hybrid vehicle including the above-described structure, it is possible to rapidly resynchronize the transmission clutch in the case that the transmission clutch has slipped under the circumstance that the vehicle is rapidly decelerated and then rapidly accelerated, enhancing driving performance of the vehicle.

Furthermore, it is possible to prevent impact thereon occurring at the resynchronizing of the transmission clutch, securing durability of the transmission.

Furthermore, since a control reducing the motor speed and the driving torque is implemented before resynchronizing the transmission clutch, it is possible to prevent occurrence of noise due to an excessive increment of the motor speed and to secure a resynchronized speed of the transmission clutch as rapidly as possible, enhancing marketability of the vehicle.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing description of specific exemplary embodiments of the present invention has been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of invention and their practical application, to enable others skilled in the art to make and utilize various alternatives and modifications thereof. It is intended \ the scope of the invention be defined by the Claims appended hereto and their equivalents.

What is claimed is:

1. A method for controlling a hybrid vehicle, the method comprising:
   detecting, by a controller, a circumstance that the vehicle is decelerated and then accelerated;
   confirming, by the controller, that a transmission clutch has slipped, in a case of detecting the circumstance that the vehicle is decelerated and then accelerated as a result of performing the detecting;
   reducing, by the controller, a driving torque and a motor speed while minimizing a hydraulic pressure of the transmission clutch, when the transmission clutch has slipped as a result of performing the confirming that the transmission clutch has slipped, in the case of detecting the circumstance that the vehicle is decelerated and then accelerated as the result of performing the detecting;

determining, by the controller, when the transmission clutch is available for synchronization while performing the reducing; and normalizing, by the controller, the hydraulic pressure of the transmission clutch and the driving torque, when the controller determines that the transmission clutch is available for the synchronization as a result of performing the determining.

2. The method for controlling the hybrid vehicle according to claim 1, wherein at the detecting, the controller is configured to detect as the circumstance that the vehicle is decelerated and then accelerated, when a depression amount of an accelerator pedal is more than Middle Tip-in (MTI) within a predetermined time period from a timing that an acceleration of the vehicle is more than a reference acceleration and a vehicle speed is less than a reference vehicle speed.

3. The method for controlling the hybrid vehicle according to claim 1, wherein at the confirming, the controller is configured to verify that the transmission clutch has slipped when the motor speed is more than a sum of an input shaft speed of the transmission and a predetermined speed.

4. The method for controlling the hybrid vehicle according to claim 1, wherein at the reducing, the controller is configured to determine and control a minimum of the hydraulic pressure of the transmission clutch based on the driving torque.

5. The method for controlling the hybrid vehicle according to claim 1, wherein at the determining, the controller is configured to determine as a status that the transmission clutch is available for the synchronization, when a difference between the motor speed and an input shaft speed of the transmission is less than a reference value.

6. The method for controlling the hybrid vehicle according to claim 1, wherein at the normalizing, the controller is configured to control normalization of the hydraulic pressure of the transmission clutch and the driving torque based on a depression amount of an accelerator pedal.

* * * * *